Aug. 18, 1964 ROBERT T. CHIEN 3,145,306
LOAD SHARING MAGNETIC SWITCHES
Filed Aug. 10, 1960 3 Sheets-Sheet 1

INVENTOR
ROBERT T. CHIEN
BY [signature]
ATTORNEY

Aug. 18, 1964 ROBERT T. CHIEN 3,145,306

LOAD SHARING MAGNETIC SWITCHES

Filed Aug. 10, 1960

3 Sheets-Sheet 2

3,145,306
LOAD SHARING MAGNETIC SWITCHES
Robert T. Chien, Yorktown Heights, N.Y., assignor to International Business Machines Corporation, New York, N.Y., a corporation of New York
Filed Aug. 10, 1960, Ser. No. 48,712
11 Claims. (Cl. 307—88)

This invention relates to switching devices and more particularly to improved magnetic load sharing switches and a method of constructing the same.

Data processing machines employ a memory which may be of magnetic core type comprising a group of memory planes, each consisting of a plurality of magnetic cores arranged in a matrix of columns and rows. Generally, each plane is provided with separate row windings, each inductively coupling a row of cores and separate column windings, each inductively coupling a column of cores. The corresponding row windings and the corresponding column windings are respectively connected so that a selected row and column winding intersects a group of cores occupying corresponding positions in the memory planes. Excitation of both a selected row and column winding causes the cores at the intersections of these windings to have their magnetic condition changed. Thus, a group of memory cores, corresponding to the bits of a data word, may be selected by applying a drive pulse coincidently to a selected row and column winding. Each plane is also provided with a sense winding inductively coupled to the cores in the plane to sense the change in the magnetic condition of the selected core in the plane.

Selection of a row winding and a column winding may be accomplished by a magnetic switch. One type of magnetic switch is the load sharing type which consists of a plurality of magnetic cores having a plurality of windings inductively coupled thereto in accordance with a predetermined combinatorial code. Each core has an output winding connected to a row or column winding in each memory. Drive means are provided for applying drive pulses coincidently to select ones of the windings so that a desired one of the cores has its magnetic condition changed inducing a signal in its output winding which is used to drive a selected row or column winding of the memory. This arrangement provides the power from similar sources to be combined into a single high power output signal. Consequently, each source need only furnish a fraction of the power required by the load.

One of the major problems encountered in magnetic switches is that all unwanted signals promote noise generated in unselected cores when the selected core is being driven. Thus, though the magnetic effect due to the drive currents passing through unselected cores in the same sense is partially cancelled by the magnetic effect due to the drive currents passing through the unselected cores in the opposite sense, the net magnetic effect causes the unselected cores to be driven a similar amount, thereby inducing a similar undesirable noise signal in the output winding thereof. This spurious output is applied to an unselected winding of the memory and may start to switch an unselected group of memory cores tending to destroy their stored information or produce incorrect outputs from the memory. This is especially so during the read time of a memory when data is being sensed in the sense winding of the memory. Furthermore, the drivers must furnish the additional power which goes into the spurious signals and does no useful work.

A class of load sharing switches which eliminates the noise generated in unselected cores when a selected core is driven has been proposed by G. Constantine in the IBM Journal of Research and Development, vol. 2, pp. 204–211, July 1958, entitled "A Load Sharing Matrix Switch," and in a copending application, Serial No. 745,-395, filed June 30, 1958, now Patent No. 3,126,528, issued March 24, 1964, which is assigned to the assignee of the instant application. This class of load sharing switches will hereinafter be referred to as the Constantine switch.

According to Constantine, a load sharing switch is constructed by utilizing a number of inputs which are equal to an integral power of two. For any desired number of outputs, a particular switch is constructed wherein the maximum number of cores is equal to $(2^{x-1})$ with the number of inputs $2^x$. Thus, if the desired number of outputs is three, then $(2^{x-1})$ must be equal to or greater than three. The term $x$ is then found to be three requiring four cores with the required number of inputs being $2^3=8$. Thus the switch constructed is capable of providing up to three outputs and when only two outputs are desired one output is not utilized. When the desired number of outputs is five through eight, a matrix of eight cores is required necessitating sixteen inputs, while for desired outputs from nine through sixteen, nine through sixteen cores are required, necessitating thirty-two inputs.

An improved class of load sharing switches has also been proposed by M. Marcus in an article entitled, "Doubling the Efficiency of the Load Sharing Matrix Switch," appearing in the IBM Journal of Research and Development, vol. 3, April 1959, pp. 194–196, and in a copending application filed November 20, 1958, having Serial No. 775,279, now Patent No. 3,140,467, issued July 7, 1964, which is also assigned to the assignee of the present application. This class of switches will hereinafter be referred to as Marcus switches.

According to the above article and application, Marcus shows how load sharing switches may be constructed for a desired number of outputs wherein the maximum number of cores is only $(2^{x-1})$ with $2^x$ inputs. Again, the number of inputs required is always an integral power of two; i.e. $2^x$. Thus, if the desired number of outputs is three then the number of required cores is $(2^{x-1})$, which must be at least equal to or greater than three. The term $x$ is then two, requiring only four cores, similar to Constantine, but necessitating only four inputs in contrast to eight required by Constantine. With seven cores, five to seven outputs are generated by the Marcus switch, requiring only eight inputs as contrasted to sixteen inputs required by Constantine, and when nine to fifteen outputs are desired, Marcus requires only sixteen inputs contrasted to the thirty-two inputs required by Constantine.

It has been found that upon close study of the winding arrangements in each of the proposed load sharing switches that the theory of orthogonal matrices may be employed to construct a more efficient and novel class of load sharing switches. More specifically, it has been found that by application of the theory of orthogonal matrices with modifications thereto, an improved class of load sharing matrices may be constructed wherein for a given number of outputs the number of inputs required is only a multiple of four which is greater than the number of outputs by at least one. Expressed in other terms, where the desired number of outputs is equal to $(n-1)$, then the number of inputs is $n$, where $n$ is an integral multiple of four. Construction of such switches materially increases the efficiency of both the Constantine and Marcus switches, since, as pointed out above, in the case where the desired number of outputs is nine, Constantine requires thirty-two inputs, Marcus requires sixteen inputs, while here the required number of inputs is only twelve.

By employing the theory of orthogonal matrices, it is known that for any one orthogonal matrix, each row may be considered as a sequence of binary variables, i.e. 1's and 0's or $+1$'s and $-1$'s. This taken together with their complement sequences provides a code of $8k$ for $4k$ bits with a distance of $2k$. According to an article entitled "Binary Codes with Specified Minimum Distance," available at the Moore School of Engineering, Res. Div., University of Pennsylvania, Philadelphia, Rept. 51–20, January 1951, by M. Plotkin, it is proved that the designation $$A(4k, 2k) \leqslant 8k$$

exists, which means there can be at most $4k$ orthogonal sequences of $4k$ bits. Thus for any number of outputs desired the best one can do is to go to the next multiple of four where an orthogonal matrix exists. Therefore, by realizing that the theory of orthogonal matrices may be applied to construct a load sharing switch, it becomes evident from the above cited article by Plotkin that the greatest efficiency one might achieve is a switch wherein the number of inputs is a multiple of four.

What has been found, therefore, is that a magnetic switch comprising a plurality of magnetic elements such as magnetic cores having a plurality of $n$ input windings may be provided each coupling all the elements, in accordance with a predetermined combinatorial code, wherein the number of input windings, $n$, is equal to the least multiple of four which is greater than the number of elements; i.e., where the number of elements is $(n-1)$, the number of input windings is $n$. Driver current is then supplied coincidently to selected ones of the input windings for selecting one of the elements, and the windings are so wound on the selected element that the magnetic effect thereon due to the currents in the selected windings is additive to produce excitation of the selected element, while the selected windings are so wound on the remaining unselected elements that the magnetic effect thereon due to currents in the selected windings is cancelled to produce no excitation of the remaining unselected elements.

Accordingly, it is a prime object of this invention to provide novel and improved load sharing switches.

It is another object of this invention to provide novel load sharing switches wherein the number of input drivers is a multiple of four and the maximum number of outputs for any one switch is one less than the total number of drivers.

Yet another object of this invention is to provide a novel and improved class of load sharing switches based upon the theory of orthogonal matrices.

Still another object of this invention is to provide an improved class of load sharing switches requiring a minimum number of inputs for a desired number of outputs.

Another object of this invention is to provide novel load sharing matrices constructed in accordance with different methods based upon the theory of orthogonal matrix construction with modification thereto to satisfy the conditions for a load sharing switch.

The foregoing and other objects, features and advantages of the invention will be apparent from the following more particular description of preferred embodiments of the invention, as illustrated in the accompanying drawings.

Figure 1:
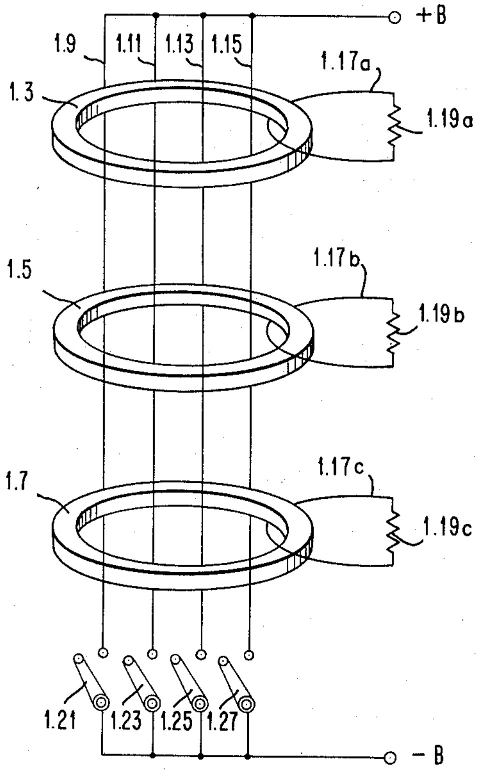
FIG. 1 is a schematic drawing of a magnetic switch of the prior art.

Referring now to FIG. 1, there is shown a schematic diagram of one embodiment of a load sharing switch disclosed in the above cited copending application of Marcus. It comprises a magnetic switch which includes three magnetic cores 1.3, 1.5 and 1.7 which may be toroidal in shape, though other suitable shapes may be used. Four input windings 1.9, 1.11, 1.13 and 1.15 are serially wound, in a different pattern, through the three cores to a source +B with the windings paired off so that half of the windings for a core pass through the core in a first sense, and the other half of the windings pass in opposite sense through each core. Each core has an output winding **1.17*a*–1.17*c*, which is connected to a row or column winding of the memory, represented by a resistor load 1.19*a*–1.19*c*. Four switches 1.21, 1.23, 1.25 and 1.27 are respectively connected between the four input windings 1.9, 1.11, 1.13 and 1.15**, and a terminal −B, to enable selective energization of different windings. Although the switches are indicated as manually operated for the sake of simplicity, any suitable type of switch may be employed, such as electronic tube devices, transistors, etc.

Figure 2:
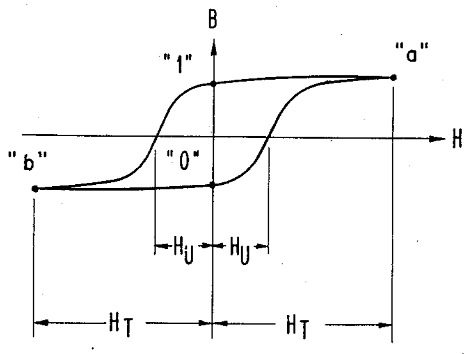
FIG. 2 is a hysteresis curve which is illustrated as an aid in understanding operation of the switch of FIG. 1.

Referring now to FIG. 2, there is shown a typical hysteresis loop for a magnetic core. Magnetic cores possess two stable or remanent states of magnetization which are opposite in sense and, consequently, a magnetic core may operate as a binary element with one remanent state representing the binary digit 1 and the opposite remanent state representing the binary digit 0. The application of a drive current pulse to a wire passing through a magnetic core causing the core to follow the hysteresis loop as a function of the direction and magnitude of the current. The value of the magnitude of current necessary to generate a magnetomotive force sufficient to change the state of the core may be referred to as the threshold value. If the magnitude of the applied drive current pulse has a value which is less than the threshold value, then the core experiences some magnetic excursion on the hysteresis loop but when the current is removed the core will return to essentially the same remanent state at which it started. On the other hand, if the magnitude of the drive current pulse has a value which is equal to or greater than the threshold value and the current is applied in the proper direction, then the core changes from one remanent state to the other.

Considering unipolar drive current pulses, the sense of a winding may be defined as the direction in which it passes through the core. Accordingly, a winding in the "1" sense may arbitrarily be designated as passing over and under a core so that a unipolar drive current pulse applied thereto causes a magnetomotive force to be generated which tends to drive the core towards magnetic saturation in the 1 state. A winding in the "0" sense (also referred to elsewhere as −1) may be designated as passing under and over a core so that a unipolar drive current pulse applied thereto causes a magnetomotive force to be generated which tends to drive the core towards magnetic saturation in the 0 state. Thus, considering a core in the 0 state and a winding passing therethrough in the "1" sense, then if a unipolar drive current pulse is applied to the winding, the magnitude of which has a value greater than the threshold value, the core follows the hysteresis loop to the saturation point "*a*" and when the drive current pulse is terminated the core comes to rest in the 1 state. Likewise, considering the core in the 1 state and a winding passing therethrough in the "0" sense, then, if a unipolar drive current pulse is applied to the winding, the magnitude of which has a value greater than the threshold value, the core follows the hysteresis loop to the saturation point "*b*" and when the drive current pulse is terminated the core comes to rest in the 0 state. The change in flux, when the core switches from the 0 state to the 1 state, induces an output pulse in the output winding of the core which may be used as a read drive pulse for a selected column or row winding of memory. Likewise, the change in flux, when the core switches from the 1 state to the 0 state, induces an output pulse in the output winding of the core equal in magnitude but opposite in sense to that of the output pulse produced when the core switches from the 0 state to the 1 state and may be used as a write drive pulse for the selected column or row winding of memory. The use of 0 to 1 as a write pulse, and consequently, 1 to 0 as a read pulse is equally possible.

The principle of load sharing is to combine the magnetomotive forces generated by the currents in several driving windings so that the combined magnetomotive force has a value equal to that generated by the current which would otherwise be applied to a single driving winding. Consequently, each driving circuit need only furnish a fraction of the current required to change the state of the magnetic core. This reduction in current and power required from each driving circuit is especially advantageous where the current-carrying capacity of the driving switches must be kept small. Thus, in the present case the unit of current provided by each driver generates a unit magnetomotive force $H_U$ which is equal to $$H_T/\frac{N}{2}$$

where $H_T$ is the total magnetomotive force required to drive the core and N is the total number of driving windings. In applying the principle of load sharing, N windings are inductively coupled to a core with one half of the windings passing through the core in the "1" sense and the other half of the windings passing through the core in the "0" sense. Consequently, $$\frac{N}{2}$$

windings pass through the core in the "1" sense and $$\frac{N}{2}$$

windings pass through the core in the "0" sense. Hence, during read time of a memory cycle, by applying drive current pulses coincidentally to the $$\frac{N}{2}$$

windings in the "1" sense, $$\frac{N}{2}$$

units of magnetomotive force are combined to drive a core, which is in the 0 state, to the 1 state. The change in flux, when the core switches from the 0 state to the 1 state, induces an output pulse in the output winding of the core which may be used as a read drive pulse for a selected column or row winding of memory. Likewise, during write time of a memory cycle, by applying drive current pulses coincidently to the $$\frac{N}{2}$$

windings in the "0" sense, $$\frac{N}{2}$$

units of magnetomotive force are combined to drive the core, which is in the 1 state, to the 0 state. The change in flux, when the core switches from the 1 state to the 0 state, induces an output pulse in the output winding of the core equal in magnitude but opposite in sense to that of the first mentioned output pulse which may be used as a write drive pulse for the selected column or row winding of memory.

In the FIG. 1, the load sharing magnetic switch of the prior art may be considered as consisting of a plurality of cores having N windings inductively coupled thereto with a different winding pattern for each core so that a single core may be uniquely selected without generating spurious outputs from any of the remaining unselected cores. To accomplish this result, a particular winding pattern must be developed.

The basic winding pattern according to Marcus is considered on the basis of the winding sense previously described, which can be represented tabularly as

[1 0] or [1 −1]

This, then, is the tabular representation of a 2 input, 1 output switch, comprising a single core, with a "1" winding to set the core in a 1 state and a "0" winding to set the core in a 0 state.

To obtain the winding pattern for the next larger complete matrix, that is the next larger matrix which is capable of utilizing all usable combinations of inputs, the following procedure is employed:

(1) The first row of the present winding pattern is extended in both directions by adding the same values to each side of the existing values, to give the first row of the new pattern, thus,

← · · · 111 [10] 000 · · · →

(2) Form two rows of the new winding patter, for each row of the present winding pattern, by repeating the present row values in the first three quadrants of the tabular area, and inserting the complement of the present values in the fourth quadrant, thus

| II | I |
|---|---|
| Present Row Values | Present Row Values |
| Present Row Values | Complement of Present Row Values |
| III | IV |

The next larger complete winding pattern will accordingly have one more than twice the number of rows in the present pattern.

As an example, consider the manner of deriving the winding pattern for the 4 input, 3 output matrix shown in FIG. 1 of the drawings.

First the basic element "10" is expanded in accordance with the first value by adding the same values once to each side so that the pattern for the first row becomes:

"1100"

In accordance with rule two, the basic pattern is expanded by placing the row value, for each row of the present pattern ("10") in the first 3 quadrants of the tabular area and the complement value of the row values for the present pattern ("01") in the fourth quadrant, thus

| | |
|---|---|
| 10 | 10 |
| 10 | 01 |

Now combining the row found by the first rule with the two additional rows found by the second rule, the winding pattern for the 4 input, 3 output matrix is 1100
1010
1001

The winding pattern given above in tabular form corresponds to the winding pattern of the cores shown in FIG. 1. Each row of the winding pattern corresponds to a core, and each column to the serially connected drive windings. Inspection of the drawings shows that, for the first core 1.3, the first and second windings, from left to right, thread the core in an "over and under" or "1" sense, and the third and fourth windings thread the core in an "under and over" or "0" sense, thus corresponding to the "1100" pattern of the first row in the table. Similarly, the first and third windings thread core 1.5 in the "1" sense, while the second and fourth windings thread this core in the "0" sense. The windings on the other cores may be compared with the winding pattern in similar fashion.

In the operation of the magnetic switch, selection of a core to be driven from the 0 state to the 1 state is accomplished by exciting all of the windings which pass through that core in the "1" sense in accordance with the read selection pattern. Likewise, selection of a core to be driven from the 1 state to the 0 state is accomplished by exciting all of the windings which pass through that core in the "0" sense in accordance with the write selection pattern.

Thus, assume that all of the cores 1.3, 1.5 and 1.7 are in the 0 state and that it is desired to select core 1.5 corresponding to the pattern 1010, to be changed to the 1 state. Switches 1.21 and 1.25 are accordingly closed to apply drive current pulses via windings 1.9 and 1.13. Referring to the winding pattern above, it will be noted that core 1.5 is the only core receiving two units of magnetomotive force in the "1" sense which, as can be seen from the equation previously defined, is required to switch the core. Consequently, core 1.5 will be driven from the 0 state to the 1 state inducing an output pulse in the output winding **1.17*b* to drive the load 1.19*b***.

If the switch is employed to supply driving pulses to a magnetic core storage matrix, the output pulse may correspond to a "read" drive pulse to read data out of storage.

Referring again to the winding pattern, it will be noted that when drive current pulses are applied to windings 1.9, 1.13 to select core 1.5, cores 1.3 and 1.7 each receive one unit of magnetomotive force in the "1" sense and one unit of magnetomotive force in the "0" sense which cancel each other so that no spurious output pulses are applied to any of the output windings **1.17*a* or 1.17*c*. In a similar manner, cores 1.3 and 1.7** may be selected by applying drive current pulses to the proper windings so that the combined magnetomotive force drives the selected core from the 0 state to the 1 state while the remaining unselected magnetic cores receive zero excitation resulting in no spurious outputs being generated in the output windings of the unselected cores.

When a new data word is to be written or the previously read out data word is to be rewritten into the selected group of cores in memory, a write driver pulse must be generated which is equal in magnitude but opposite in polarity to that of the read driver pulse previously generated. This is accomplished by restoring the previously selected core of the magnetic switch from the 1 state to the 0 state. Accordingly, switches 1.23 and 1.27 are closed to apply drive current pulses via windings 1.11 and 1.15. Referring to the winding pattern, it will be noted that the previously selected core 1.5, corresponding to the pattern 1010, is the only core now receiving two units of magnetomotive force in the "0" sense. Consequently, core 1.5 will be driven from the 1 state to the 0 state inducing an output pulse in the output winding **1.17*b* which is equal in magnitude but opposite in polarity to the output pulse previously produced when the core was switched from the 0 state to the 1 state. The unselected cores in the switch will each receive balanced inputs, so that no spurious outputs are generated at this time. In a similar manner, either of the other cores 1.3 and 1.7** may be selected by applying drive current pulses to the proper windings so that the combined magnetomotive force drives the selected core from the 1 state to the 0 state while the remaining unselected magnetic cores receive zero excitation resulting in no spurious outputs being generated in the output windings of the unselected cores.

In view of the result that is obtained with this type of magnetic switch, the choice of input voltage and current supplied through the selected core, the number of turns on the input and output windings, and the core dimensions and material are a matter of transformer design and are not of major concern here. Whether linear or square loop core material is used in a particular application does not affect the ability of the input windings to excite only one core. It should be apparent from the foregoing description that the magnetic switch of the present invention combines the principle of load sharing with the elimination of spurious outputs. As a result, the switch economizes on the amount of power required from each driver since the additional power which would normally go into the spurious outputs is not required.

It may be seen from the above that the features required of a noiseless load-sharing matrix switch such as shown in FIG. 1 are that (1) Half the input drivers are excited each time for any input pattern.

(2) For each excitation only one output wire is excited, the excitation utilizes all input power and in all other output wires the net excitation is zero.

These requirements may be translated to the requirement on the winding patterns, since the logical structure of a core switch is fixed by the winding patterns of the cores.

Thus the winding pattern of the magnetic cores may be represented by a winding matrix. Each row gives the winding pattern for a core, each column gives the winding pattern for an input driver. The entries are either +1's or −1's (0's). As described above, the matrix entry is +1 if the input winding passes through the core in the reference direction, and is −1 (or 0), if the winding passes through the core in an opposite sense. Conditions (1) and (2) can then be restated in terms of the winding matrix as:

(1*w*) Each row must have as many 1's as −1's.

(2*w*) Take any two rows of *b* and *c* from the matrix, the sum of the values of the entries of row *c* must be zero for the columns where row *b* has entry one. The same must be true for columns where row *b* has −1 entries.

For instance, the winding matrix of the switch of FIG. 1 is translated below as:

1100
1010
1001 and may be seen to satisfy conditions (1*w*) and (2*w*).

The conditions for an orthogonal matrix is given by the relationship:

$$\sum_{j=0}^{n-1} a_{ij}\, a_{kj}=0 \quad \text{for } i \neq k$$

and it is seen that each row of the matrix of FIG. 1 fulfills this condition. The main difficulty, however, is that an orthogonal matrix does not, necessarily, satisfy conditions (1*w*) and (2*w*).

It has been found that given an orthogonal matrix of *m* rows, it is possible to construct a winding matrix of $m-1$ rows. To accomplish this, a number of columns in the given matrix are complemented to make the first row consist of +1 entries exclusively. The remaining $m-1$ rows will then satisfy conditions (1*w*) and (2*w*).

Methods of constructing orthogonal matrices have been studied by mathematicians for some time, and the results obtained by R. E. A. Paley, in an article entitled "ON Orthogonal Matrices," appearing in the Journal of Mathematics and Physics, vol. 12, pp. 311–320, 1933, seems to be the most complete. By employing the Paley theory of othogonal matrices with modifications, novel load sharing switches may be constructed in accordance therewith.

In the following Lemmas, *m* denotes the number of columns in the matrix.

Lemma 0—If $m \neq 1, 2$, then $m$ is divisible by 4.

Lemma 1—If we have an orthogonal matrix, hereinafter defined as a "U-matrix," of the order $m_1$, and a U-matrix of order $m_2$, then we may construct a U-matrix of order $m_1 m_2$. The construction is accomplished by substituting $U_{m2}$ for each "+1" in $U_{m1}$ and the complement of $U_{m2}$ for each "−1" in $U_{m1}$.

*Method of Construction According to Lemma 1*

In designing a switching matrix in accordance with Lemma 1, it is stated that if a switching matrix is given of the order $m-1$ rows by $m$ columns and another switching matrix is given as $n-1$ rows by $n$ columns, it is possible to construct a new switching matrix of the order $mn-1$ by $mn$ where the number of inputs is a power of two. To accomplish the above, employ the following steps:

Step I—Augment both matrices by a row of +1's such that both become square matrices.

Step II—Take matrix $m$ as a base and substitute for every +1 entry the matrix $n$, and for every −1 entry the complement of matrix $n$.

Step III—Remove the row of all +1's.

As an example, consider a matrix where the number of inputs is a power of two, such as four. For this case $$nm = m \times n$$

or $$4 = 2 \times 2$$

In the case both $m$ and $n$ are equal to 2 and any two input matrix must be given by $$+1, -1$$

According to step I, both matrices are augmented such that $$n = \begin{array}{cc} +1 & +1 \\ +1 & -1 \end{array} \quad \text{and} \quad m = \begin{array}{cc} +1 & +1 \\ +1 & -1 \end{array}$$

to provide square matrices.

Following step II, $$\begin{array}{cc|cc} +1 & +1 & +1 & +1 \\ +1 & -1 & +1 & -1 \\ \hline +1 & +1 & -1 & -1 \\ +1 & -1 & -1 & +1 \end{array}$$

the desired square matrix is generated. The final three output, four input matrix is provided by removing the row of all +1's to provide $$\begin{array}{cccc} 1 & -1 & 1 & -1 \\ 1 & 1 & -1 & -1 \\ 1 & -1 & -1 & 1 \end{array}$$

or, in terms of 1's and 0's is:

1010
1100
1001

This structure is seen to be equivalent to the structure of FIG. 1 of the prior art.

As another example, consider construction of an eight input switch which is a power of two. In this case, the matrix generated by step II of the previous example is considered the $m$ matrix and the $n$ matrix is again substituted according to step II to provide:

$$\begin{array}{cc|cc|cc|cc} 1 & 1 & 1 & 1 & 1 & 1 & 1 & 1 \\ 1 & -1 & 1 & -1 & 1 & -1 & 1 & -1 \\ \hline 1 & 1 & -1 & -1 & 1 & 1 & -1 & -1 \\ 1 & -1 & -1 & 1 & 1 & -1 & -1 & 1 \\ \hline 1 & 1 & 1 & 1 & -1 & -1 & -1 & -1 \\ 1 & -1 & 1 & -1 & -1 & 1 & -1 & 1 \\ \hline 1 & 1 & -1 & -1 & -1 & -1 & 1 & 1 \\ 1 & -1 & -1 & 1 & -1 & 1 & 1 & -1 \end{array}$$

and the eight input seven output switch is generated by removing the row of all 1's according to step III to provide:

$$\begin{array}{cccccccc} 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{array}$$

or, in terms of 1's and 0's, 1 0 1 0 1 0 1 0
1 1 0 0 1 1 0 0
1 0 0 1 1 0 0 1
1 1 1 1 0 0 0 0
1 0 1 0 0 1 0 1
1 1 0 0 0 0 1 1
1 0 0 1 0 1 1 0

Figure 3:
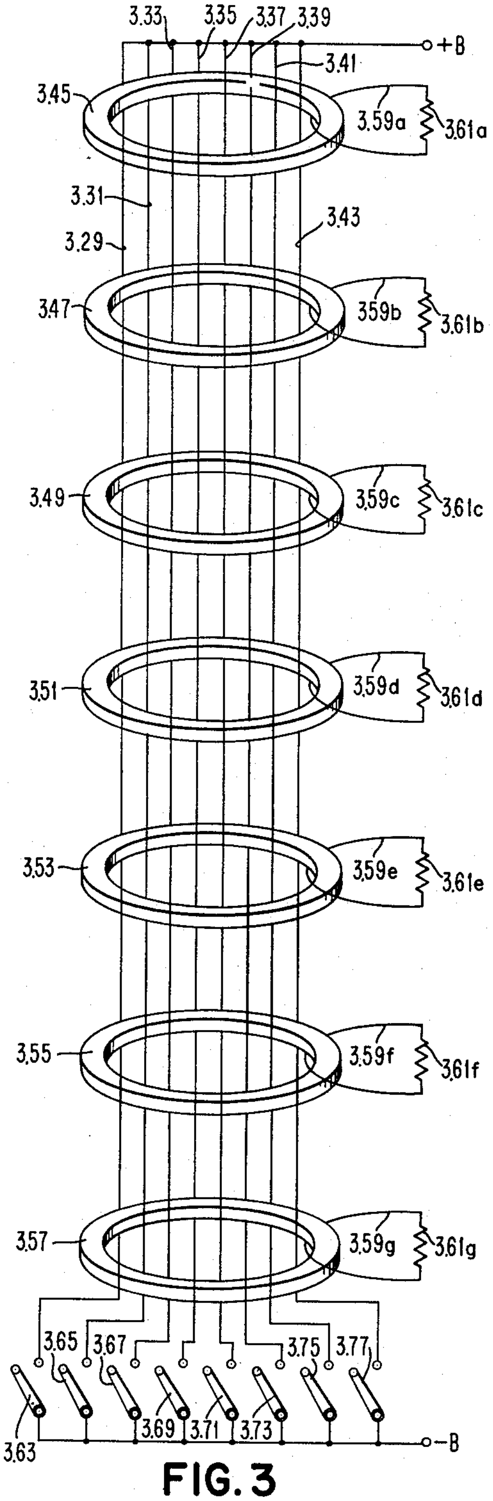
FIG. 3 is another schematic drawing of a magnetic switch of the prior art.

This matrix is similar to the winding pattern of the load sharing switch shown in FIG. 3 which is that described by Marcus in the above cited copending application. Referring to the FIG. 3, there is shown a load sharing switch disclosed by Marcus in the above cited copending application having seven outputs selected by proper combinations of eight inputs. Eight input windings 3.29, 3.31, 3.33, 3.35, 3.37, 3.39, 3.41 and 3.43 are provided each linking cores 3.45, 3.47, 3.49, 3.51, 3.53, 3.55 and 3.57 corresponding to the winding pattern given below.

1 1 1 1 0 0 0 0
1 1 0 0 1 1 0 0
1 1 0 0 0 0 1 1
1 0 1 0 1 0 1 0
1 0 1 0 0 1 0 1
1 0 0 1 1 0 0 1
1 0 0 1 0 1 1 0

Each of the cores 3.45–3.57 is provided with an output winding 3.59*a* through 3.59*g*, connected to load 3.61*a* through 3.61*g*, respectively. To select a particular one of the cores for reading or writing, half of the total input windings are energized in proper combination, by closing of selected ones of switches 3.63, 3.65, 3.67, 3.69, 3.71, 3.73, 3.75 and 3.77.

For example, if core 3.51 is to be energized in the "1" sense, switches 3.63, 3.67, 3.71 and 3.75 are closed to energize windings 3.29, 3.33, 3.37 and 3.41, all of which thread core 3.51 in the "1" sense and which are balanced between the "1" sense and the "0" sense in all other cores. The parts are proportioned and arranged so that the total flux required to switch core 3.51 is four times the amount supplied by energization of a single winding. Accordingly, not only does core 3.51 receive full energization, but the inputs to the remaining cores are balanced out so that an output signal is provided only from winding 3.59*d* to load 3.61*d*; and no spurious signals are generated in the remaining output windings.

Referring to the winding pattern generated above by use of Lemma 1 to construct an orthogonal matrix and modifications to provide the conditions for an eight input matrix and the matrix of Marcus discussed with respect to the switch of FIG. 3, it may be seen by interchanging the columns of the generated matrix according to Lemma 1 that the matrix for the winding pattern of FIG. 3 is achieved and thus they are similar.

This method, use of Lemma 1 with modifications thereto; i.e. deletion of all +1's in the first row, then degenerates to the method set forth by Marcus where the original U-matrix is a power of 2 and therefore provides the matrix structure for all matrices whose inputs are a power of two; i.e. $2^x$.

Lemma 1 is in reality more general in nature, since by definition, if a U-matrix of order $m_1$ is given and another U-matrix of order $m_2$ is known, a U-matrix of order $m_1 m_2$ may be constructed. In the different examples given above, both $m_1$ and $m_2$ were in fact U-matrices which are a power of two and therefore only switches which have inputs $n$ which are a power of two are generated. If one U-matrix is not a power of two, then other matrices may be generated which are double the matrix not a power of two. For instance, if the first U-matrix is given by two inputs and the second matrix is given by twelve inputs, then a matrix of twenty-four inputs may be generated. This will become clearer subsequently where a specific example will be shown.

Returning now to the theory of orthogonal matrices, further switch matrices may be constructed by the theorem:

Lemma 2—If $m$ be of the form $(p+1)$, where $p \equiv 3 \pmod{4}$, is prime, then construction of a U-matrix of the order $m$ is accomplished by symbolizing a Legendre symbol $(n/p)$ by L $(n)$ and writing:

$$a_{ij}=+1, \text{ where } i=0 \text{ or } j=0$$
$$a_{ij}=L(j-i), \text{ where } 1 \leqq i \leqq p,\ 1 \leqq j \leqq p,\ i \neq j$$
$$a_{ij}=-1, \text{ where } 1 \leqq i \leqq p$$

*Method of Construction Employing Lemma 2*

The Legendre symbols $(n/p)$ denoted by L $(n)$ is defined as $+1$ (or $-1$) if $n$ is a quadratic residue (or non-residue) of prime $p$. An explanation of Legendre functions is given in a book entitled, "The Theory of Numbers," by R. Carmichael, published by John Wiley & Sons, Inc., New York, N.Y., 1914. It has been found that it is easiest to evaluate all L ($n$'s) for $n<p$ at the same time.

Construction of a load sharing matrix is then achieved by use of Lemma 2 only where $n$, the number of inputs, is a multiple of four and when $n-1$ is a prime number $p$, by following the subsequent steps.

(L2) Step I—List all numbers from zero to $p-1$ and find all squares and reduce these squares by multiples of $p$ so that the resulting numbers are less than $p$. These numbers are called quadratic residues of $p$.

(L2) Step II—Compute a sequence according to $a_0\ a_1\ a_2,\ a_3,\ a_4 \ldots a_{p-1}$ and insert $a+1$ for $a_0$ and wherever the subscript is a quadratic residue and $a-1$ where the subscript is not a quadratic residue.

(L2) Step III—Cyclicly shift the sequence obtained in Step II to obtain a matrix of $p$ by $p$ according to the sequence below:

$$\begin{array}{l}
a_0\ a_1\ a_2\ a_3\ \ldots\ a_{p-2}\ a_{p-1} \\
a_{p-1}\ a_0\ a_1\ a_2\ \ldots\ a_{p-3}\ a_{p-2} \\
a_{p-2}\ a_{p-1}\ a_0\ a_1\ \ldots\ a_{p-4}\ a_{p-3} \\
\ldots\ldots\ldots\ldots \\
a_1\ a_2\ a_3\ a_4\ \ldots\ a_{p-1}\ a_0
\end{array}$$

(L2) Step IV—Add a column of $-1$'s at the end of the matrix obtained in step III to obtain the final matrix.

Before providing examples of how the above matrix is constructed, it may, at this point, be beneficial to define a prime number $p$. A prime number, $p$, is defined as that number which is not divisible by any other number except itself and one. Examples of prime numbers are 1, 2, 3, 5, 7, 11, 17, 19, 23, 29, 31, 37, 41, 43, 47, 53, 59, 61, 67, 71, 73, 79, 83, 89, 97, 101, 103, 107, 109, etc. Considering the prime numbers together with the requirement set forth above, i.e., "that the number of inputs is a multiple of four," then it should be possible to construct a four input matrix, $(4-1)=3$; an eight input matrix $(8-1)=7$; a twelve input matrix $(12-1)=11$; a twenty input matrix $(20-1)=19$; etc.

As an example, consider construction of a four input matrix. The prime number $p$ is then 3. The first step, according to Lemma 2, is to find all quadratic residues of numbers from zero to $p-1$.

| Numbers: | Quadratic residues |
|---|---|
| 1 | 1 |
| 2 | 1 ($2\times2=4$ and $4-3=1$) |

According to the next steps, a matrix of $p$ by $p$ is formed by forming a sequence, cylicly shifting the sequence and adding a column $-1$'s at the end.

$$\begin{array}{rrrr}
1 & 1 & -1 & -1 \\
-1 & 1 & 1 & -1 \\
1 & -1 & 1 & -1
\end{array}$$

which, in terms of 1's and 0's, is:

$$\begin{array}{cccc}
1 & 1 & 0 & 0 \\
0 & 1 & 1 & 0 \\
1 & 0 & 1 & 0
\end{array}$$

Figure 4:
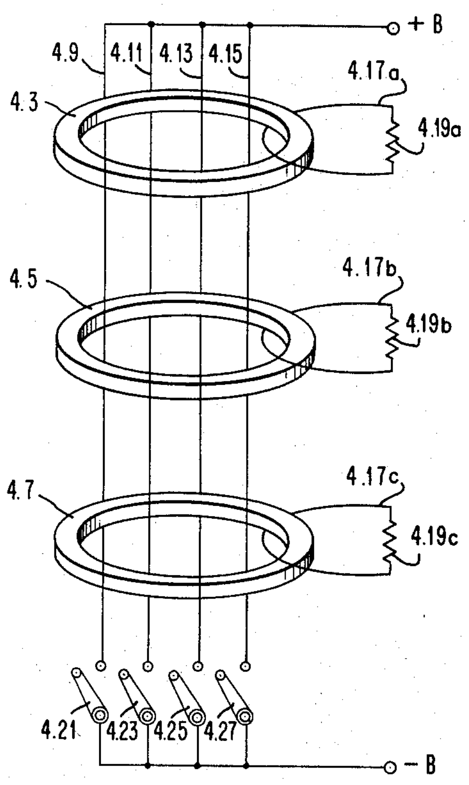
FIG. 4 is a schematic drawing of a four input magnetic switch constructed in accordance with this invention.

The matrix structure generated above is shown in the FIG. 4. Operation of this load sharing matrix is similar to that described above for the switch of FIG. 1 but with a different winding pattern. Referring to the switch of FIG. 4, a magnetic switch including three magnetic cores 4.3, 4.5 and 4.7 are provided with four input windings 4.9, 4.11, 4.13 and 4.15 individually coupling each of the cores in accordance with the combinatorial code constructed in accordance with Lemma 2. One side of each winding is commoned to the source +B and again, as in FIG. 1, the windings are paired off so that half the windings for a given core pass through the core in one sense while the other half pass through the core in opposite sense. The remaining structure of switches and the like are comparable with those shown in FIG. 1 and are so labelled with the first number denoting the figure. Selection of a particular core is accomplished in the same fashion with the difference residing in the winding configuration of the input windings 4.9–4.15 in accordance with the matrix design for the four input switch according to Lemma 2.

As another example, consider construction of an eight input switch according to Lemma 2. The prime number $p=7$ and $(p+1)=8$, therefore, first compute quadratic residues.

| Numbers: | Quadratic residues |
|---|---|
| 1 | 1 |
| 2 | 4 |
| 3 | 2 ($3\times3=9-7=2$) |
| 4 | 2 ($4\times4=16$ and $16-14=2$) |
| 5 | 4 ($5\times5=25$ and $25-21=4$) |
| 6 | 1 ($6\times6=36$ and $36-35=1$) |

Next, compute the sequence, cyclicly shift the sequence and add a column of $-1$'s.

$$\begin{array}{rrrrrrrr}
+1 & +1 & +1 & -1 & +1 & -1 & -1 & -1 \\
-1 & +1 & +1 & +1 & -1 & +1 & -1 & -1 \\
-1 & -1 & +1 & +1 & +1 & -1 & +1 & -1 \\
+1 & -1 & -1 & +1 & +1 & +1 & -1 & -1 \\
-1 & +1 & -1 & -1 & +1 & +1 & +1 & -1 \\
+1 & -1 & +1 & -1 & -1 & +1 & +1 & -1 \\
+1 & +1 & -1 & +1 & -1 & -1 & +1 & -1
\end{array}$$

Thus the matrix winding configuration of an eight input-seven output load sharing switch has been generated. For comparison, the same matrix in terms of 1's and 0's is given below:

$$\begin{array}{cccccccc}
1 & 1 & 1 & 0 & 1 & 0 & 0 & 0 \\
0 & 1 & 1 & 1 & 0 & 1 & 0 & 0 \\
0 & 0 & 1 & 1 & 1 & 0 & 1 & 0 \\
1 & 0 & 0 & 1 & 1 & 1 & 0 & 0 \\
0 & 1 & 0 & 0 & 1 & 1 & 1 & 0 \\
1 & 0 & 1 & 0 & 0 & 1 & 1 & 0 \\
1 & 1 & 0 & 1 & 0 & 0 & 1 & 0
\end{array}$$

Figure 5:
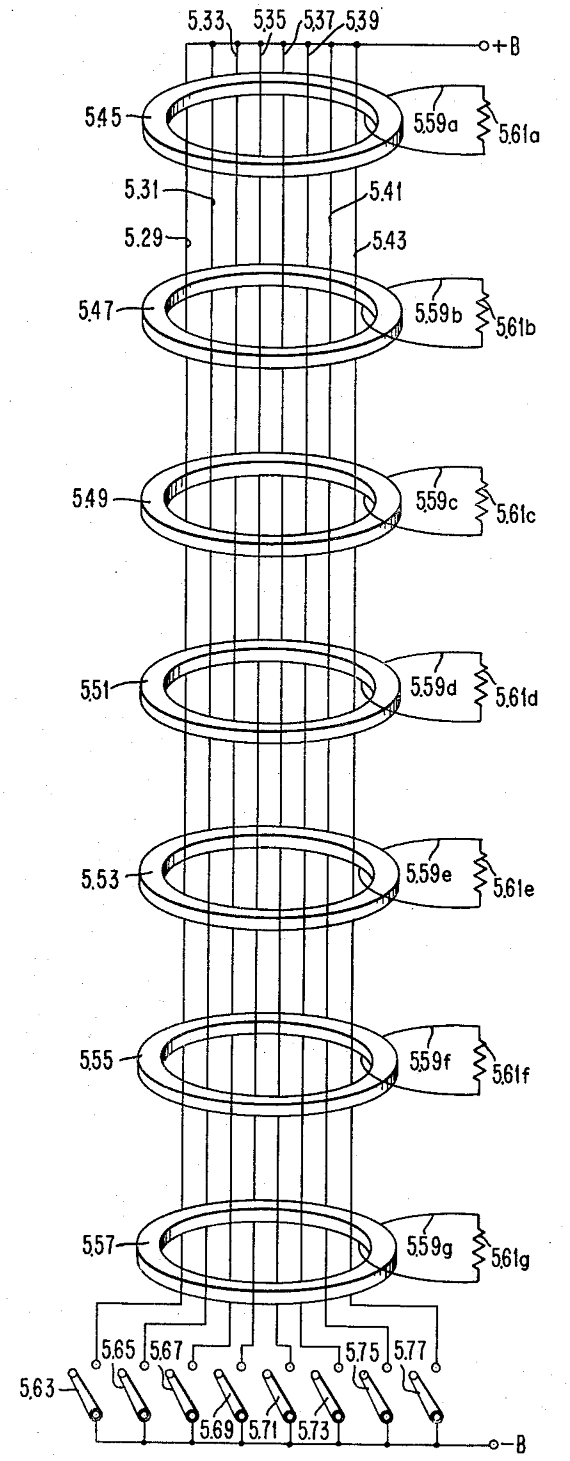
FIG. 5 is a schematic drawing of an eight input magnetic switch constructed in accordance with this invention.

Referring to the FIG. 5, input windings 5.29, 5.31, 5.33, 5.35, 5.37, 5.39, 5.41 and 5.43 linking cores 5.45, 5.47, 5.49, 5.51, 5.53, 5.55 and 5.57 show correspondence with the winding pattern given above. As shown, each of the cores is provided with an output winding **5.59*a* through 5.59*g*, connected to loads 5.61*a* through 5.61*g*, respectively. Again, to select a particular one of the cores for reading or writing, half of the total input windings is energized in the proper combination by closing selected ones of switches 5.63, 5.65, 5.67, 5.69, 5.71, 5.73, 5.75 and 5.77**.

In the FIG. 5, if the core 5.51 is to be energized in the "1" sense, switches 5.63, 5.69, 5.71 and 5.73 are closed to energize windings 5.29, 5.35, 5.37 and 5.39, respectively, all of which thread core 5.51 in the "1" sense, and which are balanced between the "1" sense the "0" sense in all other cores. Conversely, if the core 5.51 is to be energized in the "0" sense, switches 5.65, 5.67, 5.75 and 5.77 are closed, energizing windings 5.31, 5.33, 5.41 and 5.43, respectively, all of which thread the core 5.51 in the "0" sense, so that the reverse polarity output is provided from output winding 5.59$d$ to load 5.61$d$, while inputs to each of the remaining cores are cancelled.

Comparison of the switch shown in FIG. 3 with that of FIG. 5 shows that although each achieve the same type operation, the winding configuration in each, and hence the structural arrangement differs, requiring energization of different input windings to select a particular core.

As another example of how a load sharing switch may be constructed, consider the case where the desired number of outputs is eleven. As stated above, construction of such a switch requires sixteen cores and thirty-two inputs according to the Constantine switch arrangement or fifteen cores with sixteen inputs according to Marcus. By use of Lemma 2 a switch comprising eleven cores with only twelve inputs is required, substantially improving the efficiency of both Constantine and Marcus. Accordingly, since $n$, the number of inputs is twelve, which is a multiple of four and $(n-1)$ is a prime number, 11, the first step is to find all quadratic residues of numbers up to $(p-1)$.

| Number: | Quadratic residues |
|---|---|
| 1 | 1 |
| 2 | 4 |
| 3 | 9 |
| 4 | 5 ($4\times4=16$ and $16-11=5$) |
| 5 | 3 ($5\times5=25$ and $25-22=3$) |
| 6 | 3 ($6\times6=36$ and $36-33=3$) |
| 7 | 5 ($7\times7=49$ and $49-44=5$) |
| 8 | 9 ($8\times8=64$ and $64-55=9$) |
| 9 | 4 ($9\times9=81$ and $81-77=4$) |
| 10 | 1 ($10\times10=100$ and $100-99=1$) |

Next, compute the sequence, cyclicly shifting the sequence and adding a column of $-1$'s provides the U-matrix below.

| | | | | | | | | | | | |
|---|---|---|---|---|---|---|---|---|---|---|---|
| 1 | 1 | −1 | 1 | 1 | 1 | −1 | −1 | −1 | 1 | −1 | −1 |
| −1 | 1 | 1 | −1 | 1 | 1 | 1 | −1 | −1 | −1 | 1 | −1 |
| 1 | −1 | 1 | 1 | −1 | 1 | 1 | 1 | −1 | −1 | −1 | −1 |
| −1 | 1 | −1 | 1 | 1 | −1 | 1 | 1 | 1 | −1 | −1 | −1 |
| −1 | −1 | 1 | −1 | 1 | 1 | −1 | 1 | 1 | 1 | −1 | −1 |
| −1 | −1 | −1 | 1 | −1 | 1 | 1 | −1 | 1 | 1 | 1 | −1 |
| 1 | −1 | −1 | −1 | 1 | −1 | 1 | 1 | −1 | 1 | 1 | −1 |
| 1 | 1 | −1 | −1 | −1 | 1 | −1 | 1 | 1 | −1 | 1 | −1 |
| 1 | 1 | 1 | −1 | −1 | −1 | 1 | −1 | 1 | 1 | −1 | −1 |
| −1 | 1 | 1 | 1 | −1 | −1 | −1 | 1 | −1 | 1 | 1 | −1 |
| 1 | −1 | 1 | 1 | 1 | −1 | −1 | −1 | 1 | −1 | 1 | −1 |

Figure 6:
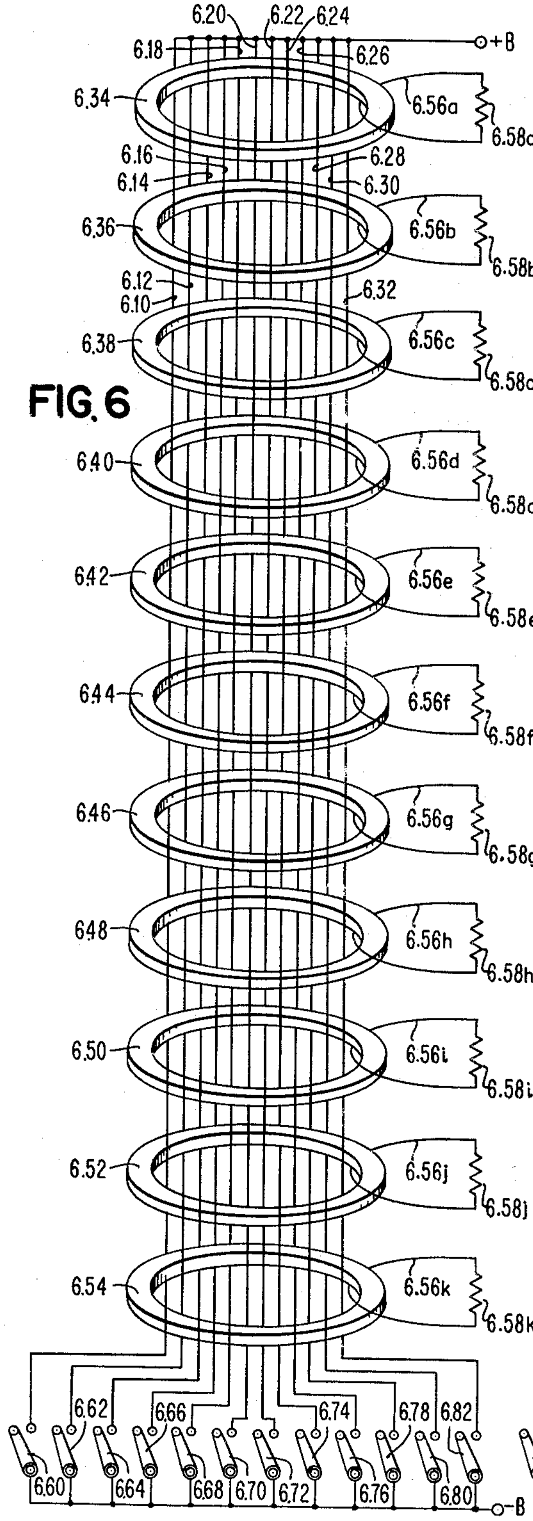
FIG. 6 is a schematic drawing of a twelve input magnetic switch constructed in accordance with this invention.

Referring to the FIG. 6, input windings 6.10 through 6.32 each linking cores 6.34 through 6.54 correspond to the winding pattern given above to form an eleven output load sharing switch. Each of the cores is provided with an output winding 6.56$a$ through 6.56$k$ connected to loads 6.58$a$ through 6.58$k$, respectively. One end of each input winding 6.10 through 6.32 is connected to +B while the other end of each input winding is connected to −B through switches 6.60 through 6.82, respectively. Again, to select a particular one of the cores for reading or writing, half the total input windings are energized in proper combination by closing selected ones of the switches 6.60 through 6.82.

It is apparent from the above that load sharing switches may be constructed if the desired number of outputs is a prime number $p$ where $p+1$ is a multiple of four providing switches of greater efficiency as is shown with the eleven output switch constructed and shown in FIG. 6. To emphasize the efficiency gained, consider the need of a load sharing switch which requires nineteen outputs. Constantine switches require thirty-two cores with sixty-four inputs; Marcus switches require thirty-one cores with thirty-two inputs, while construction according to this application requires only nineteen cores with twenty inputs. Where the number of outputs increases, the efficiency is even more apparent. For example, where the number of required outputs is sixty-five, Marcus requires one hundred and twenty-eight inputs as compared with only sixty-eight when constructing a switch according to these teachings; or when one hundred and twenty-nine outputs are required Marcus requires two hundred and fifty-six inputs as compared with only one hundred and thirty-two inputs according to this disclosure.

Returning again to the theory of orthogonal matrices another method is provided:

Lemma 3—If $m$ is a multiple of four and of the form $2^k(p+1)$, when $p$ is a prime number, then a U-matrix can be constructed of the order $m$, if $p$ is equal to $(4k+1)$. In these cases where $p=(4k-1)$, Lemma 1 or Lemma 2 is employed, or combinations of both.

*Construction According to Lemma 3*

The following steps to design a U-matrix and obtain the desired switch matrix are followed in accordance with Lemma 3.

(L3) Step I—Find all quadratic residues of numbers from zero to $p-1$ as in L2, Step I.

(L3) Step II—List a sequence as in L2, Step II and insert a 1 if the subscript is a quadratic residue, insert a $-1$ where the subscript is not a quadratic residue and insert a 0 for $a_0$.

(L3) Step III—Cyclicly permute the sequence of Step II $p-1$ times and add a row of all +1's and a column of all +1's and a 0 at the intersection of the row and column to derive a $p$ by $p$ matrix.

(L3) Step IV—In the $p$ by $p$ matrix of Step III substitute as follows:

(a) for all +1's substitute $\begin{matrix} +1 & +1 \\ +1 & -1 \end{matrix}$ (b) for all −1's substitute $\begin{matrix} -1 & -1 \\ -1 & +1 \end{matrix}$ (c) for all 0's substitute $\begin{matrix} +1 & -1 \\ -1 & -1 \end{matrix}$ (L3) Step V—Complement the columns such that the first row of the matrix of Step IV becomes all +1's and delete this first row. This then provides the desired matrix.

In all the following examples it is assumed that in the expression $2^k(p+1)$ that the value $k$ is 1. If the value $k$ were zero the expression degenerates to a matrix where $n=p+1$ which may be easily constructed by use of Lemma 2.

Figure 7:
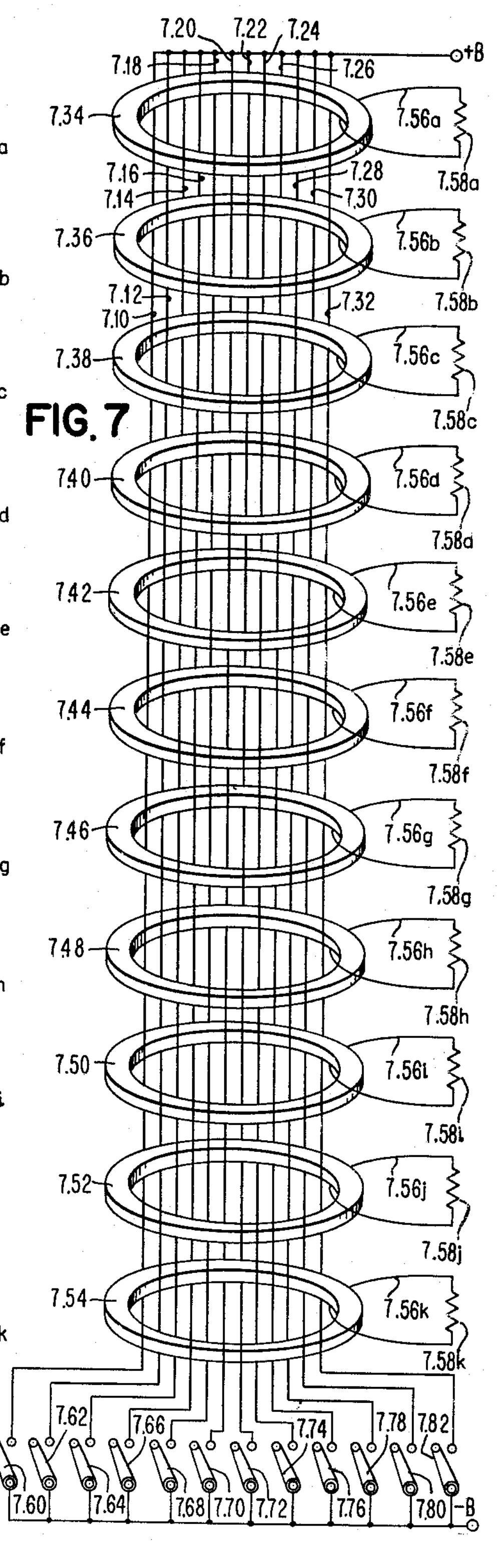
FIG. 7 is a schematic drawing of another twelve input magnetic switch constructed in accordance with this invention.

As an example, consider construction of a twelve input load sharing switch as shown in the FIG. 7. According to Lemma 3, the number of inputs $n=2(p+1)$, therefore $p$ is 5 and $5=(4k+1)$ where $k=1$. The quadratic residues are 1 and 4. Writing the sequence;

$$0 \quad 1 \quad -1 \quad -1 \quad 1$$

cyclicly shifting the sequence;

$$\begin{matrix} 0 & 1 & -1 & -1 & 1 \\ 1 & 0 & 1 & -1 & -1 \\ -1 & 1 & 0 & 1 & -1 \\ -1 & -1 & 1 & 0 & 1 \\ 1 & -1 & -1 & 1 & 0 \end{matrix}$$

adding a row and columns of +1's with a 0 at the intersection;

| | | | | | |
|---|---|---|---|---|---|
| 1 | 1 | 1 | 1 | 1 | 0 |
| 0 | 1 | −1 | −1 | 1 | 1 |
| 1 | 0 | 1 | −1 | −1 | 1 |
| −1 | 1 | 0 | 1 | −1 | 1 |
| −1 | −1 | 1 | 0 | 1 | 1 |
| 1 | −1 | −1 | 1 | 0 | 1 |

substituting and complementing the last column such that the first row becomes all +1's and deleting this row

| | | | | | | | | | | | |
|---|---|---|---|---|---|---|---|---|---|---|---|
| 1 | −1 | 1 | −1 | 1 | −1 | 1 | −1 | 1 | −1 | −1 | 1 |
| 1 | −1 | 1 | 1 | −1 | −1 | −1 | −1 | 1 | 1 | 1 | −1 |
| −1 | −1 | 1 | −1 | −1 | 1 | −1 | 1 | 1 | −1 | 1 | 1 |
| 1 | 1 | 1 | −1 | 1 | 1 | −1 | −1 | −1 | −1 | 1 | −1 |
| 1 | −1 | −1 | −1 | 1 | −1 | −1 | 1 | −1 | 1 | 1 | 1 |
| −1 | −1 | 1 | 1 | 1 | −1 | 1 | 1 | −1 | −1 | 1 | −1 |
| −1 | 1 | 1 | −1 | −1 | −1 | 1 | −1 | −1 | 1 | 1 | 1 |
| −1 | −1 | −1 | −1 | 1 | 1 | 1 | −1 | 1 | 1 | 1 | −1 |
| −1 | 1 | −1 | 1 | 1 | −1 | −1 | −1 | 1 | −1 | 1 | 1 |
| 1 | 1 | −1 | −1 | −1 | −1 | 1 | 1 | 1 | −1 | 1 | −1 |
| 1 | −1 | −1 | 1 | −1 | 1 | 1 | −1 | −1 | −1 | 1 | 1 |

the final matrix is generated for a twelve input load sharing switch.

Referring to the FIG. 7 a twelve input load sharing switch capable of delivering up to eleven outputs is shown wherein input windings 7.10 through 7.32 are provided each coupling of eleven cores 7.34 through 7.54 corresponding to the winding pattern given above in the matrix generated. Each of the cores is provided with an output winding 7.56*a* through 7.56*k* connected to loads 7.58*a* through 7.58*k*, respectively. One end of each input winding 7.10 through 7.32 is connected to +B while the other end of each input winding is connected to −B through switches 7.60 through 7.82, respectively. To select a particular one of the cores for reading or writing, half the total input windings are energized in proper combination by closing selected ones of the switches 7.60 through 7.82 so that the net excitation to all other cores is zero and a maximum for the selected core.

By use of Lemma 3, where $n=2^k(p+1)$ and $k$ is 1, not only may switches having twelve inputs be generated, but switches having thirty-six inputs, 2(17+1); sixty inputs, 2(29+1); seventy-six inputs, 2(37+1); eighty-four inputs, 2(41+1); etc., where $p=(4k+1)$ and the greatest number of outputs for any one switch is $n-1$. It should be noted that by use of Lemma 3, other matrix arrangements may be generated by changing the value of $k$, however where $k$ is equal to zero the expression becomes $(p+1)$ which is easier to generate by use of Lemma 2 and thus the use of Lemma 3 becomes important for generating matrices for those input conditions not capable of being generated by Lemma 2.

In the special instances where a desired input condition is a multiple of four but where Lemmas 2 and 3 cannot be employed to generate the desired matrix, such as twenty-eight input switch, a fifty-two, a fifty-six, etc. input switches, another more complicated theory may be employed.

Lemma 4—If $n$ is a multiple of four and in the form of $2^k(p^h+1)$ where $p$ is an odd prime a U-matrix of order $n$ can be constructed. We may repeat the argument of the last two Lemmas and instead of quadratic residues (mod. $p$) we consider quadratic residues in the Galois field of polynomials (mod. $p$, mod. P) where P ($x$) is an irreducible polynominal of degree $h$. A definition and explanation of Galois fields is given in a book entitled "Survey of Modern Algebra," by Birkhoff and MacLane, published by the Mcmillan Company, and a book entitled "Modern Algebra," vol. 1, by Van der Waerden, published by Frederick Ungar Publishing Company, 1953.

In the above two Lemmas where the Legendre function was established by finding quadratic residues, there is found $$\frac{p-1}{2}$$

quadratic residues for each prime, so half the numbers will have a value "+1" for the Legendre function. To evaluate the Legendre functions in Galois fields, the same process is employed with slight modifications. In Galois fields of $p^h$, the numbers used are the totality of all polynomials of order less than $h$ with coefficients consisting of integers less than $p$. Consider the table listed below:

| | | | | | | | | |
|---|---|---|---|---|---|---|---|---|
| g---- | 1 | 2 | $x$ | $2x$ | $x+1$ | $2x+1$ | $x+2$ | $2x+2$ |
| $g^2$--- | 1 | 4 | $x^2$ | $4x^2$ | $x^2+2x+1$ | $4x^2+4x+1$ | $x^2+4x+4$ | $4x^2+8x+4$ |
| $g^2$--- | 1 | 4 | $x+1$ | $x+4$ | $3x+2$ | $8x+5$ | $5x+5$ | $12x+8$ |
| $g^2$--- | 1 | 1 | $x+1$ | $x+1$ | 2 | $2x+2$ | $2x+2$ | 2 |
| L (g) | 1 | 1 | −1 | −1 | 1 | −1 | −1 | 1 |

for GF ($3^2$) there are eight non-zero members, namely the members in the first row of the above table. The second row contains the squares of the first row entries which are reduced to polynomials of order less than $m$ by employing the defining identity of GF ($3^2$) which is $x^2=x+1$, derived from the irreducible polynomial $x^2-x-1=0$. Other irreducible polynomials which are needed for construction of switches up to one hundred and ninety-nine outputs are:

$$GF\ (3^3)x^3-x-2=0$$
$$GF\ (5^2)x^2-2x-2=0$$
$$GF\ (7^2)x^2-x-4=0$$

Thus, if the number of inputs $n$ is a multiple of four and if $n$ is of the form $(p^h+1)$, then a switching matrix is formed as follows:

*Method of Construction According to Lemma 4*

(L4) Step I—Select an irreducible polynomial of order $h$ of prime $p$ with $x$ as a primitive root. A list of irreducible polynomials may be found in two papers by W. H. Bussey, entitled "Galois Field Tables for $p^n \leqslant 169$," appearing in the Bulletin of the American Mathematical Society, XII (1905), pages 22–38, and "Galois Field Tables of Order Less Than 1,000," ibid., XVI (1909), pages 188–208.

(L4) Step II—Form a table of coefficients of polynomials starting with the coefficients of a polynomial which is equal to $x$.

(L4) Step III—For all entries ($a$), the matrix is determined as follows, where $i$ indicates the row of the matrix starting at the top and $j$ represents the column of the matrix starting from the bottom, substitute:

$a_{ij}=+1$, where $i$ or $j=0$
$a_{ij}=+1$, where $P_j-P_i$ is a quadratic residue (mod. $p$, mod. H) where H is an irreducible polynomial of order $k$ and $i\neq j$
$a_{ij}=-1$, where $P_j-P_i$ is not a quadratic residue and $i\neq j$
$a_{ij}=-1$, where $i=j$ (L4) Step IV—Delete the first row of all +1's.

As an example, consider construction of a switch having twenty-eight inputs. The number of inputs $n$ in the form of $(p^h+1)$ is given by $(3^3+1)$. The irreducible polynomial, P, is given by $x^3-x-2=0$. Thus $x^3=x+2$. Next, form a table of coefficients of polynomials, according to step II, starting with the coefficient of a polynomial which is equal to $x$.

$$
\begin{array}{ll}
x=0+x+0 & =010 \\
x^2=x^2+0+0 & =100 \\
x^3=x+2=0+x+2 & =012 \\
x^4=x(x^3)=x^2+2x=x^2+2x+0 & =120 \\
x^5=x(x^4)=x^3+2x^2=2x^2+x+2 & =212 \\
x^6=x(x^5)=2x^3+x^2+2x=x^2+4x+4=x^2+x+1 & =111 \\
x^7=x(x^6)=x^3+4x^2+4x=4x^2+5x+2=x^2+2x+2 & =122 \\
x^8=x(x^7)=x^3+2x=2x^2+3x+2=2x^2+0x+2 & =202 \\
x^9=x(x^8)=2x^3+2x=0x^2+4x+4=0x^2+x+1 & =011 \\
x^{10}=x(x^9)=x^2+x=x^2+x+0 & =110 \\
x^{11}=x(x^{10})=x^3+x^2=x^2+x+2 & =112 \\
x^{12}=x(x^{11})=x^3+x^2+2x=x^2+3x+2=x^2+0x+2 & =102 \\
x^{13}=x(x^{12})=x^3+2x=0x^2+3x+2=0x^2+0x+2 & =002 \\
x^{14}=x(x^{13})=2x=0x^2+2x+0 & =020 \\
x^{15}=x(x^{14})=2x^2=2x^2+0x+0 & =200 \\
x^{16}=x(x^{15})=2x^3=2x+4=2x+1=0x^2+2x+1 & =021 \\
x^{17}=x(x^{16})=2x^2+x=2x^2+x+0 & =210 \\
x^{18}=x(x^{17})=2x^3+x^2=x^2+2x+4=x^2+2x+1 & =121 \\
x^{19}=x(x^{18})=x^3+2x^2+x=2x^2+2x+2 & =222 \\
x^{20}=x(x^{19})=2x^3+2x^2+2x=2x^2+4x+4=2x^2+x+1 & =211 \\
x^{21}=x(x^{20})=2x^3+x^2+x=x^2+3x+4=x^2+0x+1 & =101 \\
x^{22}=x(x^{21})=x^3+x=2x+2=0x^2+2x+2 & =022 \\
x^{23}=x(x^{22})=2x^2+2x+0 & =220 \\
x^{24}=x(x^{23})=2x^3+2x^2=2x^2+2x+4=2x^2+2x+1 & =221 \\
x^{25}=x(x^{24})=2x^3+2x^2=2x^2+3x+4=2x^2+0x+1 & =201 \\
x^{26}=x(x^{25})=2x^3+x=3x+4=0x^2+0x+1 & =001 \\
x^{27}=x(x^{26})=x & =010
\end{array}
$$

At this point it is believed to be apparent how a load sharing switch is constructed by use of the matrix above and a physical showing thereof is obvious in view of the foregoing discussion with reference to the FIGS. 1–7.

It has therefore been shown how load sharing switches having inputs $n$ which are a multiple of four may be constructed having $(n-1)$ outputs. In the interest of providing a complete understanding of the type switches which may be constructed by use of the various methods outlined in this application and the prior art, a table is given below wherein the different columns represent a partial listing of the switches defined by the number of input windings up to eighty-eight and the different switches capable of being constructed according to Constantine, Marcus and the methods described herein as shown in the different rows wherein a check mark at the intersection of the appropriate column and row designates construction of such a switch by the particular method.

| | 4 | 8 | 12 | 16 | 20 | 24 | 28 | 32 | 36 | 40 | 44 | 48 | 52 | 56 | 60 | 64 | 68 | 72 | 76 | 80 | 84 | 88 |
|---|---|---|---|---|---|---|---|---|---|---|---|---|---|---|---|---|---|---|---|---|---|---|
| Constantine switch | ✓ | ✓ | | ✓ | | | | ✓ | | | | | | | | ✓ | | | | | | |
| Marcus switch | ✓ | ✓ | | ✓ | | | | ✓ | | | | | | | | ✓ | | | | | | |
| Lemma 1 | ✓ | ✓ | | ✓ | | | | ✓ | | | | | | | | ✓ | | | | | | |
| Lemma 2 | ✓ | ✓ | ✓ | | ✓ | ✓ | | ✓ | | | ✓ | ✓ | | | ✓ | | ✓ | ✓ | | ✓ | ✓ | |
| Lemma 3 | | | ✓ | | | | | | ✓ | | | ✓ | | | ✓ | | | | ✓ | | ✓ | |
| Lemma 4 | | | | | | | ✓ | | | | | | ✓ | ✓ | | | | | | | | |

As may be seen the process ends with $x^{26}$, since the next polynomial, $x^{27}$, is really the first, $x$, and therefore the listing necessary is only $x$ through $x^{26}$.

According to Step III, the initial matrix having $j$ columns and $i$ rows is generated by placing $a_{ij}=+1$ where $i$ or $j=0$. This in effect states that the first column and first row will be all +1's. Next, $a_{ij}=+1$ when $P_j-P_i$ is a quadratic residue. In the list of polynomials generated above, all squares are quadratic residues, i.e., $x^2$, $x^4$, $x^6$ . . . $x^{2y}$, where $y$ is an integer. Further, $a_{ij}=-1$ if $P_j-P_i$ is not a quadratic residue. Consider for example generation of the second row of the matrix, given in form below.

$$
\begin{array}{lcccccc}
 & a_{1,0} & a_{1,1} & a_{1,2} & a_{1,3} & \ldots & a_{1,28} \\
\text{substituting:} & & & & & & \\
 & 1 & (x-x) & (x^2-x) & (x^3-x) & (x^4-x) \ldots & (x^{27}-x) \\
\text{to provide:} & & & & & & \\
 & 1 & 0 & x & x^2 & x^3 \ldots & x^{26} \\
\text{now putting values:} & & & & & & \\
 & 1 & 0 & -1 & 1 & -1 \ldots & 1
\end{array}
$$

and substituting $a-1$ for the 0 since at this point the $i$th row and the $j$th column are equal, i.e., $a_{ij}=-1$, the second row takes the form $$1 \quad -1 \quad -1 \quad 1 \quad -1 \quad \ldots \quad 1$$

and the final matrix then takes the form given below, wherein the first row of all +1's have been deleted.

+1−1+1−1−1−1−1+1+1+1+1−1+1+1+1−1+1+1−1−1−1+1−1+1−1−1+1−1
+1−1−1+1−1−1−1+1+1+1+1+1−1−1+1+1−1+1+1+1−1−1−1−1+1−1−1+1
+1+1−1−1−1−1−1+1+1+1−1+1+1+1−1+1+1−1+1−1+1−1+1−1−1+1−1−1
+1+1+1+1−1+1−1−1−1−1+1+1−1+1−1+1+1+1−1−1+1−1−1−1+1−1−1−1
+1+1+1+1−1−1+1−1−1−1−1+1+1+1+1−1−1+1+1−1−1+1+1−1−1−1−1+1
+1+1+1+1+1−1−1−1−1−1+1−1+1−1+1+1+1−1+1+1−1−1−1−1−1−1−1−1
+1−1−1−1+1+1+1−1+1−1+1+1−1+1+1−1+1−1+1−1+1−1−1+1−1−1−1+1
+1−1−1−1+1+1+1−1−1+1−1+1+1−1+1+1+1+1−1−1−1+1−1−1−1+1−1−1
+1−1−1−1+1+1+1+1−1−1+1−1+1+1−1+1−1+1+1+1−1−1+1−1−1−1+1−1
+1−1−1+1−1+1−1−1+1−1−1+1−1−1−1−1+1+1+1+1−1+1+1+1−1+1+1−1
+1+1−1−1−1−1+1−1−1+1−1−1+1−1−1−1+1+1+1+1+1−1−1−1+1−1+1+1
+1−1+1−1+1−1−1+1−1−1+1−1−1−1−1−1+1+1+1−1−1+1+1−1−1+1−1+1
+1−1+1−1−1−1+1−1+1−1+1+1+1−1+1−1−1−1−1+1+1−1+1−1+1+1+1−1
+1−1−1+1+1−1−1−1−1+1+1+1+1−1−1+1−1−1−1−1+1+1+1+1−1−1+1−1
+1+1−1−1−1+1−1+1−1−1+1+1+1+1−1−1−1−1−1+1−1+1−1+1+1+1−1+1
+1−1+1−1−1+1−1−1−1+1−1−1−1+1+1+1−1+1−1+1+1−1+1+1−1+1−1+1
+1−1−1+1−1−1+1+1−1−1−1−1−1+1+1+1−1−1+1−1+1+1−1+1+1+1+1−1
+1+1−1−1+1−1−1−1+1−1−1−1−1+1+1+1+1−1−1+1−1+1+1−1+1−1+1+1
+1+1−1+1+1+1−1+1+1−1−1−1+1−1+1−1−1+1−1−1+1−1−1−1−1+1+1+1
+1+1+1−1−1+1+1−1+1+1+1−1−1−1−1+1−1−1+1−1−1+1−1−1−1+1+1+1
+1−1+1+1+1−1+1+1−1+1−1+1−1+1−1−1+1−1−1+1−1−1−1−1−1+1+1+1
+1−1+1+1+1−1+1+1−1+1−1+1−1+1−1−1+1−1−1+1−1−1−1−1−1+1+1+1
+1+1+1−1+1−1+1+1+1−1−1+1−1−1−1+1−1+1−1+1+1+1−1+1−1−1−1−1
+1−1+1+1+1+1−1−1+1+1−1−1+1+1−1−1−1−1+1+1+1+1−1−1+1−1−1−1
+1+1−1+1−1+1+1+1−1+1+1−1−1−1+1−1+1−1−1+1+1+1+1−1−1−1−1−1
+1+1+1−1+1+1−1+1−1+1−1+1−1−1+1−1−1−1+1−1−1−1+1+1+1−1+1−1
+1−1+1+1−1+1+1+1+1−1−1−1+1−1−1+1+1−1−1−1−1−1+1+1+1−1−1+1
+1+1−1+1+1−1+1−1+1+1+1−1−1+1−1−1−1+1−1−1−1−1+1+1+1+1−1−1

As stated above, Lemma 1 is the most powerful and useful method to derive different U-matrices. The examples described above with respect to Lemma 1 illustrated construction of U-matrices and hence desired switch matrices wherein both the U-matrices $m$ and $n$ were an integral power of two, i.e., the case where $m=2$ and $n=2$ to derive a four input switch and the case where $m=2$ and $n=4$ to derive an eight input switch. If it were desired to derive a twenty-four input switch having a different construction than the derivation thereof by use of Lemma 2, the switch may be derived by use of Lemma 1 employing any twelve input U-matrix originally derived by Lemma 3 as the $n$ matrix and employing the $m$ matrix as the basic two input matrix. Consider the switch matrix derived above by use of Lemma 3 with the added row of all +1's to provide the U-matrix construction. The basic U-matrix $n$, wherein $n$ is two, is given above as:

$$
\begin{array}{cc}
+1 & +1 \\
+1 & -1
\end{array}
$$

by substituting this matrix in the U-matrix derived above for every +1 entry and its complement for every −1 entry and thereafter removing the top row of all +1's, a switch where $n=24$ and the number of outputs is $n-1=23$ is derived whose structure will differ from that derived by use of Lemma 2. The flexibility of the above methods has been shown by considering derivation of the twenty-four input switch. Where $n=24$, it has been shown that $n=23+1$ which is the form of $p+1$. The switch may then be derived by use of Lemma 2. It has further been shown that where $n=24$, it is also in the form of $2(11+1)$ or $2(p+1)$ which may be derived by use of Lemma 1 where the twelve input switch is given or derived by use of Lemma 2. It becomes clear, then, that by employing the basic orthogonal matrix of two, and any other U-matrix originally derived by either Lemmas 2, 3 or 4, a further U-matrix may be derived to provide a switch which is double the number of that given by Lemmas 2, 3 or 4. Thus by use of the twenty input switch derived by Lemma 2, a forty input switch is derived by use of Lemma 1. Similarly, by use of the eight input switch derived by Lemma 2, a sixteen input switch may be derived by use of Lemma 1 whose structure differs from that derived by Lemma 1 alone. It is therefore apparent that by employing any one matrix adding a row of +1's give the U-matrix:

$$\begin{array}{cccccccc}
+1 & +1 & +1 & +1 & +1 & +1 & +1 & +1 \\
+1 & +1 & +1 & -1 & +1 & -1 & -1 & -1 \\
-1 & +1 & +1 & +1 & -1 & +1 & -1 & -1 \\
-1 & -1 & +1 & +1 & +1 & -1 & +1 & -1 \\
+1 & -1 & -1 & +1 & +1 & +1 & -1 & -1 \\
-1 & +1 & -1 & -1 & +1 & +1 & +1 & -1 \\
+1 & -1 & +1 & -1 & -1 & +1 & +1 & -1 \\
+1 & +1 & -1 & +1 & -1 & -1 & +1 & -1
\end{array}$$

substituting:

$$\begin{array}{cc} +1 & +1 \\ +1 & -1 \end{array} \text{ for all } +1\text{'s} \qquad \begin{array}{cc} -1 & -1 \\ -1 & +1 \end{array} \text{ for all } -1\text{'s}$$

and eliminating the row of all +1's $$\begin{array}{cccccccccccccccc}
+1 & -1 & +1 & -1 & +1 & -1 & +1 & -1 & +1 & -1 & +1 & -1 & +1 & -1 & +1 & -1 \\
+1 & +1 & +1 & +1 & +1 & +1 & -1 & -1 & +1 & +1 & -1 & -1 & -1 & -1 & -1 & -1 \\
+1 & -1 & +1 & -1 & +1 & -1 & -1 & +1 & +1 & -1 & -1 & +1 & -1 & +1 & -1 & +1 \\
-1 & -1 & +1 & +1 & +1 & +1 & +1 & +1 & -1 & -1 & +1 & +1 & -1 & -1 & -1 & -1 \\
-1 & +1 & +1 & -1 & +1 & -1 & +1 & -1 & -1 & +1 & +1 & -1 & -1 & +1 & -1 & +1 \\
-1 & -1 & -1 & -1 & +1 & +1 & +1 & +1 & +1 & +1 & -1 & -1 & +1 & +1 & -1 & -1 \\
-1 & +1 & -1 & +1 & +1 & -1 & +1 & -1 & +1 & -1 & -1 & +1 & +1 & -1 & -1 & +1 \\
+1 & +1 & -1 & -1 & -1 & -1 & +1 & +1 & +1 & +1 & +1 & +1 & -1 & -1 & -1 & -1 \\
+1 & -1 & -1 & +1 & -1 & +1 & +1 & -1 & +1 & -1 & +1 & -1 & -1 & +1 & -1 & +1 \\
-1 & -1 & +1 & +1 & -1 & -1 & -1 & -1 & +1 & +1 & +1 & +1 & +1 & +1 & -1 & -1 \\
-1 & +1 & +1 & -1 & -1 & +1 & -1 & +1 & +1 & -1 & +1 & -1 & +1 & -1 & -1 & +1 \\
+1 & +1 & -1 & -1 & +1 & +1 & -1 & -1 & -1 & -1 & +1 & +1 & +1 & +1 & -1 & -1 \\
+1 & -1 & -1 & +1 & +1 & -1 & -1 & +1 & -1 & +1 & +1 & -1 & +1 & -1 & -1 & +1 \\
+1 & +1 & +1 & +1 & -1 & -1 & +1 & +1 & -1 & -1 & -1 & -1 & +1 & +1 & -1 & -1 \\
+1 & -1 & +1 & -1 & -1 & +1 & +1 & -1 & -1 & +1 & -1 & +1 & +1 & -1 & -1 & +1
\end{array}$$

the switch matrix is derived as shown above. The same method may be employed everywhere else. Thus, a further complete listing, similar to and including the table above is given below wherein derivation of the different switches by employing combination of Lemmas 2, 3 and 4 with that of Lemma 1 is shown.

| | 4 | 8 | 12 | 16 | 20 | 24 | 28 | 32 | 36 | 40 | 44 | 48 | 52 | 56 | 60 | 64 | 68 | 72 | 76 | 80 | 84 | 88 |
|---|---|---|---|---|---|---|---|---|---|---|---|---|---|---|---|---|---|---|---|---|---|---|
| Constantine switch | ✓ | ✓ | | ✓ | | | | ✓ | | | | | | | | ✓ | | | | | | |
| Marcus switch | ✓ | ✓ | | ✓ | | | | ✓ | | | | | | | | ✓ | | | | | | |
| Lemma 1 | ✓ | ✓ | | ✓ | | | | ✓ | | | | | | | | ✓ | | | | | | |
| Lemma 2 | ✓ | ✓ | ✓ | | ✓ | ✓ | | ✓ | | | ✓ | ✓ | | | ✓ | | ✓ | ✓ | | ✓ | ✓ | |
| Lemma 2 and Lemmas 2 and 1 | ✓ | ✓ | ✓ | ✓ | ✓ | ✓ | | ✓ | | ✓ | ✓ | ✓ | | | ✓ | ✓ | ✓ | ✓ | | ✓ | ✓ | ✓ |
| Lemma 3 | | | ✓ | | | | | | ✓ | | | ✓ | | | ✓ | | | | ✓ | | ✓ | |
| Lemma 3 and Lemmas 3 and 1 | | | ✓ | | | ✓ | | | ✓ | | | ✓ | | | ✓ | | | | ✓ | | ✓ | |
| Lemma 4 | | | | | | | ✓ | | | | | | ✓ | ✓ | | | | | | | | |
| Lemma 4 and Lemmas 4 and 1 | | | | | | | ✓ | | | | | | ✓ | ✓ | | | | | | | | |

derived by use of Lemma 3 or 4, a switch having double the number of inputs with one less output $(n-1)$, may be derived by use of Lemma 1 and the basic two input U-matrix.

In order to demonstrate the above proposition, consider derivation of a sixteen input switch, given the eight input switch derived in accordance with Lemma 2.

The switch matrix for an eight input switch derived above according to Lemma 2 is repeated below:

$$\begin{array}{cccccccc}
+1 & +1 & +1 & -1 & +1 & -1 & -1 & -1 \\
-1 & +1 & +1 & +1 & -1 & +1 & -1 & -1 \\
-1 & -1 & +1 & +1 & +1 & -1 & +1 & -1 \\
+1 & -1 & -1 & +1 & +1 & +1 & -1 & -1 \\
-1 & +1 & -1 & -1 & +1 & +1 & +1 & -1 \\
+1 & -1 & +1 & -1 & -1 & +1 & +1 & -1 \\
+1 & +1 & -1 & +1 & -1 & -1 & +1 & -1
\end{array}$$

It has been shown therefore, how switches having $n-1$ outputs and $n$ inputs, where $n$ is a multiple of four may be constructed, and it has been demonstrated that such a construction is the most efficient in accordance with Plotkin. Switches having inputs which are an integral power of two have been constructed which differ structurally from that shown in the prior art which perform the desired operation.

While the invention has been particularly shown and described with reference to preferred embodiments thereof, it will be understood by those skilled in the art that various changes in form and details may be made therein without departing from the spirit and scope of the invention.

What is claimed is:

1. A magnetic load sharing switch consisting of a plurality of magnetic elements, a plurality of input windings equal to a multiple of four which is greater than the number of elements other than an order $2^x$ where $x$ is an integral number, said input windings being coupled to each of said elements in accordance with a predetermined combinatorial code, and means for applying current coincidentally to selected ones of said windings, the selected windings being wound on one of said elements in such a manner that the magnetic field generated by the current in each of said selected windings is of a similar sense and effective to produce excitation of said one element while said selected windings are wound on all the remaining of said elements in such a manner that the magnetic field generated by the current in said selected windings is cancelled to produce no excitation of said remaining elements.

2. A magnetic load sharing switch consisting of a plurality of magnetic elements, a plurality of input windings equal to the least multiple of four which is greater than the number of elements other than an order $2^x$ where $x$ is an integral number, said input windings coupling said elements in accordance with a predetermined combinatorial code, and means for selectively energizing selected ones of said input windings, each said input winding responsive to the energization thereof to provide a magnetic field of similar magnitude to each said element and further responsive to the energization of selected ones by said last means and provide fields of similar sense only to one of said elements.

3. A magnetic load sharing switch consisting of a plurality of magnetic elements, each said element being provided with an output winding, a plurality of driving circuits equal in number to the least multiple of four which is greater than the number of elements other than an order $2^x$ where $x$ is an integral number, a plurality of input windings on each of said elements equal to the number of said driving circuits, half of said input windings being coupled to the associated element in a first magnetizing sense and the other half of said input windings being coupled to the associated element in the opposite magnetizing sense, said input windings being connected to said driving circuits in binary combinatorial codes so that coincident energization of said driving circuits in binary combinations is effective to produce excitation of all of said input windings and provide magnetic fields of similar sense only for one of said elements and cancellation of magnetization in all of the remaining elements.

4. A magnetic load sharing switch consisting of a plurality of magnetic elements, an output winding provided for each said element, a plurality of input windings inductively coupled to each of said elements and equal to the least multiple of four which is greater than the number of said elements other than an order $2^x$ where $x$ is an intergral number, one half of said input windings being coupled to said elements in accordance with said predetermined combinatorial code and in a first magnetizing sense, the other half of said input windings being coupled to said elements in accordance with said predetermined combinatorial code and in a second magnetizing sense, and means for applying current of similar magnitude coincidently to selected ones of said input windings, the selected input windings being wound on one of said elements in such a manner that the fields applied thereto are of similar sense and sum of the magnetomotive force generated by the current in said selected input windings is sufficient to fully excite only one one element and provide no net field to any of the remaining elements.

5. A magnetic load sharing switch consisting of a plurality of $n$ input windings, $n$ being a multiple of four other than an order $2^x$ where $x$ is an integral number, $(n-1)$ magnetic elements, said $n$ input windings coupling said $(n-1)$ magnetic elements in accordance with a predetermined combinatorial code, and means for coincidently applying currents of similar magnitude to selected ones of said $n$ input windings, said selected input windings responsive to the energization thereof to provide magnetic fields of similar sense to only a selected one of said elements and no net field to the remaining of said elements.

6. A magnetic load sharing switch consisting of $n$ number of driving circuits, $n$ being a multiple of four other than an order $2^x$ where $x$ is an integral number, $(n-1)$ magnetic elements, a plurality of input windings on each of said elements equal to the number of said driving circuits, half of said input windings being coupled to the associated element in a first magnetizing sense and the other half of said input windings being coupled to the associated element in the opposite magnetizing sense, said input windings being connected to said driving circuits in binary combinatorial codes so that coincident energization of said driving circuits in binary combinations is effective to produce excitation of all said input windings and provide magnetic fields of similar sense only to one of said elements and cancellation of the magnetic fields in all of the remaining elements.

7. A magnetic load sharing switch consisting of a plurality of $n$ input windings, $n$ being a multiple of four other than an order $2^x$ where $x$ is an integral number, $(n-1)$ magnetic elements, an output winding provided for each said element, said input windings inductively coupling all said elements, one half of said input windings being coupled to said elements in accordance with said predetermined combinatorial code and in a first magnetizing sense, the other half of said input windings being coupled to said elements in accordance with said predetermined combinatorial code and in a second magnetizing sense, and means for applying current coincidently to selected ones of said input windings, the selected input windings being wound on one of said elements in such a manner that the magnetic field generated by the current in each of said selected input windings is of similar sense and sufficient to fully excite only said one element while the magnetic fields generated by current in each of said input windings cancels in the remaining of said elements.

8. A magnetic load sharing switch consisting of three magnetic elements, an output winding for each element, and four input windings each coupling all of said elements, each of said input windings being coupled to each said element in one of two magnetizing senses designated as a "+1" and a "−1" value respectively, said input windings being coupled to said elements in accordance with a pattern:

| | | | |
|---|---|---|---|
| +1 | +1 | −1 | −1 |
| −1 | +1 | +1 | −1 |
| +1 | −1 | +1 | −1 |

wherein each horizontal row of said pattern represents one of said magnetic elements and all values in a horizontal row of said pattern represents the sense which the input windings couple a given element and each vertical column of values of said pattern represents a particular one of said four windings in the switch coupling each of the elements, and means for applying current coincidentally to selected ones of said windings, the selected windings being wound on one of said elements in such a manner that the magnetic field generated by the current in each of said selected windings is of a similar sense and effective to produce excitation of said one element while said selected windings are wound on all the remaining of said elements in such a manner that the magnetic field generated by the current in said selected windings is cancelled to produce no excitation of said remaining elements.

9. A magnetic load sharing switch consisting essentially of seven magnetic elements, an output winding for each element, and eight input windings each coupling all said elements, each of said input windings being coupled to each said element in one of two magnetizing senses designated as a "+1" and a "—1" value respectively, said input windings being coupled to said elements in accordance with a pattern:

| | | | | | | | |
|---|---|---|---|---|---|---|---|
| +1 | +1 | +1 | −1 | +1 | −1 | −1 | −1 |
| −1 | +1 | +1 | +1 | −1 | +1 | −1 | −1 |
| −1 | −1 | +1 | +1 | +1 | −1 | +1 | −1 |
| +1 | −1 | −1 | +1 | +1 | +1 | −1 | −1 |
| −1 | +1 | −1 | −1 | +1 | +1 | +1 | −1 |
| +1 | −1 | +1 | −1 | −1 | +1 | +1 | −1 |
| +1 | +1 | −1 | +1 | −1 | −1 | +1 | −1 |

where each horizontal row of values of said pattern represents a magnetic element and all values in a horizontal row of said pattern represents the sense which the input windings couple a given element and the values of each vertical column of said pattern represents a particular one of said eight windings in the switch coupling each of the elements, and means for applying current coincidently to selected ones of said windings, the selected windings being wound on one of said elements in such a manner that the magnetic field generated by the current in each of said selected windings is of a similar sense and effective to produce excitation of said one element while said selected windings are wound on all the remaining of said elements in such a manner that the magnetic field generated by the current in said selected windings is cancelled to produce no excitation of said remaining elements.

10. A magnetic load sharing switch consisting essentially of eleven magnetic elements, an output winding for each element, and twelve input windings each coupling all said elements, each of said input windings being coupled to each said element in one of two magnetizing senses designated as a "+1" and a "−1" value, respectively, said input windings being coupled to said elements in accordance with a pattern:

| | | | | | | | | | | | |
|---|---|---|---|---|---|---|---|---|---|---|---|
| +1 | −1 | +1 | −1 | +1 | −1 | +1 | −1 | +1 | −1 | −1 | +1 |
| +1 | −1 | +1 | +1 | −1 | −1 | −1 | −1 | +1 | +1 | +1 | −1 |
| −1 | −1 | +1 | −1 | −1 | +1 | −1 | +1 | +1 | −1 | +1 | +1 |
| +1 | +1 | +1 | −1 | +1 | +1 | −1 | −1 | −1 | −1 | +1 | −1 |
| +1 | −1 | −1 | −1 | +1 | −1 | −1 | +1 | −1 | +1 | +1 | +1 |
| −1 | −1 | +1 | +1 | +1 | −1 | +1 | +1 | −1 | −1 | +1 | −1 |
| −1 | +1 | +1 | −1 | −1 | −1 | +1 | −1 | −1 | +1 | +1 | +1 |
| −1 | −1 | −1 | −1 | +1 | +1 | +1 | −1 | +1 | +1 | +1 | −1 |
| −1 | +1 | −1 | +1 | +1 | −1 | −1 | −1 | +1 | −1 | +1 | +1 |
| +1 | +1 | −1 | −1 | −1 | −1 | +1 | +1 | +1 | −1 | +1 | −1 |
| +1 | −1 | −1 | +1 | −1 | +1 | +1 | −1 | −1 | −1 | +1 | +1 |

wherein each horizontal row of values of said pattern represents one of said twelve magnetic elements and all values in a horizontal row of said pattern represents the sense which the input windings couple a given element and the values of each vertical column of said pattern represents a particular one of said twelve input windings in the switch coupling each of the elements, and means for applying current coincidently to selected ones of said windings, the selected windings being wound on one of said elements in such a manner that the magnetic field generated by the current in each of said selected windings is of a similar sense and effective to produce excitation of said one element while said selected windings are wound on all the remaining of said elements in such a manner that the magnetic field generated by the current in said selected windings is cancelled to produce no excitation of said remaining elements.

11. A magnetic load sharing switch consisting essentially of eleven magnetic elements, an output winding for each element, and twelve input windings each coupling all said elements, each of said input windings being coupled to each said element in one of two magnetizing senses designated as a "+1" and a "−1" value, respectively, said input windings being coupled to said elements in accordance with a pattern:

| | | | | | | | | | | | |
|---|---|---|---|---|---|---|---|---|---|---|---|
| +1 | +1 | −1 | +1 | +1 | +1 | −1 | −1 | −1 | +1 | −1 | −1 |
| −1 | +1 | +1 | −1 | +1 | +1 | +1 | −1 | −1 | −1 | +1 | −1 |
| +1 | −1 | +1 | +1 | −1 | +1 | +1 | +1 | −1 | −1 | −1 | −1 |
| −1 | +1 | −1 | +1 | +1 | −1 | +1 | +1 | +1 | −1 | −1 | −1 |
| −1 | −1 | +1 | −1 | +1 | +1 | −1 | +1 | +1 | +1 | −1 | −1 |
| −1 | −1 | −1 | +1 | −1 | +1 | +1 | −1 | +1 | +1 | +1 | −1 |
| +1 | −1 | −1 | −1 | +1 | −1 | +1 | +1 | −1 | +1 | +1 | −1 |
| +1 | +1 | −1 | −1 | −1 | +1 | −1 | +1 | +1 | −1 | +1 | −1 |
| +1 | +1 | +1 | −1 | −1 | −1 | +1 | −1 | +1 | +1 | −1 | −1 |
| −1 | +1 | +1 | +1 | −1 | −1 | −1 | +1 | −1 | +1 | +1 | −1 |
| +1 | −1 | +1 | +1 | +1 | −1 | −1 | −1 | +1 | −1 | +1 | −1 |

wherein each horizontal row of said pattern represents one of said magnetic elements and all values in a horizontal row of said pattern represents the sense which the input windings couple a given element and the values of each vertical column of said pattern represents a particular one of said twelve input windings in the switch coupling each of the elements, and means for applying current coincidently to selected ones of said windings, the selected windings being wound on one of said elements in such a manner that the magnetic field generated by the current in each of said selected windings is of a similar sense and effective to produce excitation of said one element while said selected windings are wound on all the remaining of said elements in such a manner that the magnetic field generated by the current in said selected windings is cancelled to produce no excitations of said remaining elements.

References Cited in the file of this patent

UNITED STATES PATENTS

| | | |
|---|---|---|
| 2,691,152 | Stuart-Williams | Oct. 4, 1954 |
| 2,768,367 | Rajchman | Oct. 23, 1956 |
| 2,922,996 | Young | Jan. 26, 1960 |
| 2,971,181 | Vogl | Feb. 7, 1961 |